United States Patent [19]
Parker et al.

[11] Patent Number: 5,522,697
[45] Date of Patent: Jun. 4, 1996

[54] LOAD REDUCING VARIABLE GEOMETRY TURBINE

[75] Inventors: John F. Parker; Stephen E. Garrett, both of Huddersfield, England

[73] Assignee: Holset Engineering Company, Ltd., Huddersvield, England

[21] Appl. No.: 342,546

[22] Filed: Nov. 21, 1994

[51] Int. Cl.⁶ .................................................. F01D 17/14
[52] U.S. Cl. .......................................... 415/158; 415/165
[58] Field of Search .................................. 415/150, 157, 415/165, 158

[56] References Cited

U.S. PATENT DOCUMENTS

| | | | |
|---|---|---|---|
| 2,957,424 | 10/1960 | Brundagen et al. | 415/158 |
| 3,749,513 | 7/1973 | Chute | 415/158 |
| 4,415,307 | 11/1983 | Fortman | 415/158 |
| 4,416,583 | 11/1983 | Byrns | 415/158 |
| 4,557,665 | 12/1985 | Szczupak | 415/158 |
| 4,844,690 | 7/1989 | DeLaurier et al. | 415/158 |
| 5,183,381 | 2/1993 | McKean | 415/165 |

FOREIGN PATENT DOCUMENTS

| | | | |
|---|---|---|---|
| 0034915 | 9/1981 | European Pat. Off. | 415/158 |
| 0571205 | 11/1993 | European Pat. Off. | 415/158 |
| 0738987 | 10/1955 | United Kingdom | 415/158 |

*Primary Examiner*—Thomas E. Denion
*Assistant Examiner*—Mark Sgantzos

[57] ABSTRACT

A variable geometry turbine comprising a housing 1 including an annular cavity 19 which supports a moveable annular wall member 5. An annular turbine inlet passageway 4 is defined between an end face of the moveable wall member 5 and a facing wall 6 of the housing 1. The moveable wall member 5 is moveable so as to vary the width of the annular turbine inlet passageway 4. Gas tight seals 20, 21 are provided between the wall member 5 and radially inner and outer surfaces of the cavity 19 and apertures 24 are provided through the face of the annular wall member 5. The arrangement is such that the mean pressure difference between the cavity 19 and the annular turbine inlet passageway 4 is reduced so that the total axial load on the wall member 5 due to gas flow through the inlet passageway 4 is reduced.

6 Claims, 1 Drawing Sheet

LOAD REDUCING VARIABLE GEOMETRY TURBINE

TECHNICAL FIELD

The present invention relates to a variable geometry turbine assembly and more particularly to such an assembly that may be used in a turbosupercharger for an internal combustion engine.

BACKGROUND ART

Turbines generally comprise a centripetal turbine wheel mounted in a turbine housing, an annular turbine inlet passageway extending radially inward towards the turbine wheel periphery, a turbine volute arranged around the radially outer end of the turbine inlet passageway, and a turbine outlet passageway extending axially from the turbine housing. The passageways and housing communicate such that pressurized gas, such as exhaust gas from an internal combustion engine, is admitted to the inlet volute and flows through the annular turbine inlet passageway to the turbine outlet passageway via the turbine chamber, thereby driving the turbine wheel. The turbine wheel drives a shaft which in turn drives a centrifugal compressor.

In a variable geometry turbine, one wall of the annular turbine inlet passageway may be provided by a moveable wall member the position of which is adjustable, relative to a facing wall of the turbine inlet passageway, to control the width of the inlet passageway and therefore its cross-sectional flow area. A variety of actuation mechanisms, including hydraulic, mechanical and pneumatic, have been proposed to control the position of the moveable wall member.

For example, U.S. Pat. No. 5,044,880 describes a variable geometry turbine in which the moveable wall member is annular and formed from a sheet material, and is mounted within an annular cavity in the turbine housing. The wall member has a tubular portion extending from the radially outermost periphery of the wall member and away from the facing wall of the housing. A gas tight seal is disposed between the tubular portion and the turbine housing to prevent gas leaking from the inlet passageway to the space behind the annular wall member. Such leakage would impair the efficiency of the turbine.

In a moving sidewall type variable geometry turbine, when the volume of exhaust gas being delivered to the turbine is relatively low, the velocity of the gas reaching the turbine wheel is maintained at a level which ensures efficient turbine operation by narrowing the annular turbine inlet passageway. Vanes extending across the inlet passageway direct the gas flow into the wheel in an efficient manner. As the passageway is narrowed, for any given volume of gas flow, the velocity of the gas passing through the turbine inlet passageway increases. As a result, the radial pressure gradient across the face of the moveable wall member, from its upstream periphery to its downstream periphery, increases as the passageway is narrowed. Assuming that the radially outer edge of the moveable wall member is sealed to prevent gas leaking behind the wall member, the pressure behind the wall member will be lower than the pressure on the radially outer portions of the face of the moveable wall member. This pressure difference results in high loads on the wall member urging it toward a more open position. For example, in a turbine for a ten liter internal combustion engine, a load of 80 kg (176 lb) can be applied to the moveable wall member when the passageway width is a minimum. When braking, the pressure difference can be as high as 5 bar, resulting in a level as high as 200 kg (440 lb). These loads must be borne by the actuation system.

In addition to the disadvantageous effect on the control of the position of the moveable wall member, the high loads produced on the face of the wall member can increase wear and increase the complexity and cost of the overall variable geometry turbine which must be constructed to handle the high loads produced.

It is an object of the present invention to provide a variable geometry turbine which obviates or mitigates the above disadvantages.

DISCLOSURE OF THE INVENTION

According to the present invention there is provided a variable geometry turbine operable in response to gas flow, the turbine comprising a turbine wheel and a housing in which the turbine wheel is journaled for rotation. The housing has an annular turbine inlet passageway for gas flow extending radially inward toward the periphery of the turbine wheel and defined in part by a generally radially extending wall.

An annular moveable wall member having an end face cooperates with the radially extending wall to define the width of said annular inlet passageway as a function of the position of the end face. The radially outermost and innermost portions of said annular moveable wall member are sealed from the gas flow in said annular turbine inlet passageway. A plurality of apertures extending through the radially extending wall of the annular moveable wall member to connect the pressure in the gas flow through said annular turbine inlet passageway with the side of the annular moveable wall member which is opposite to the gas flow. The apertures are positioned at a given radial position to generate an opposing force against movement of the annular moveable wall member in the direction to increase the width of said annular inlet passageway to minimize the force required to move the annular moveable wall member.

BEST MODE FOR CARRYING OUT INVENTION

Figure 1:
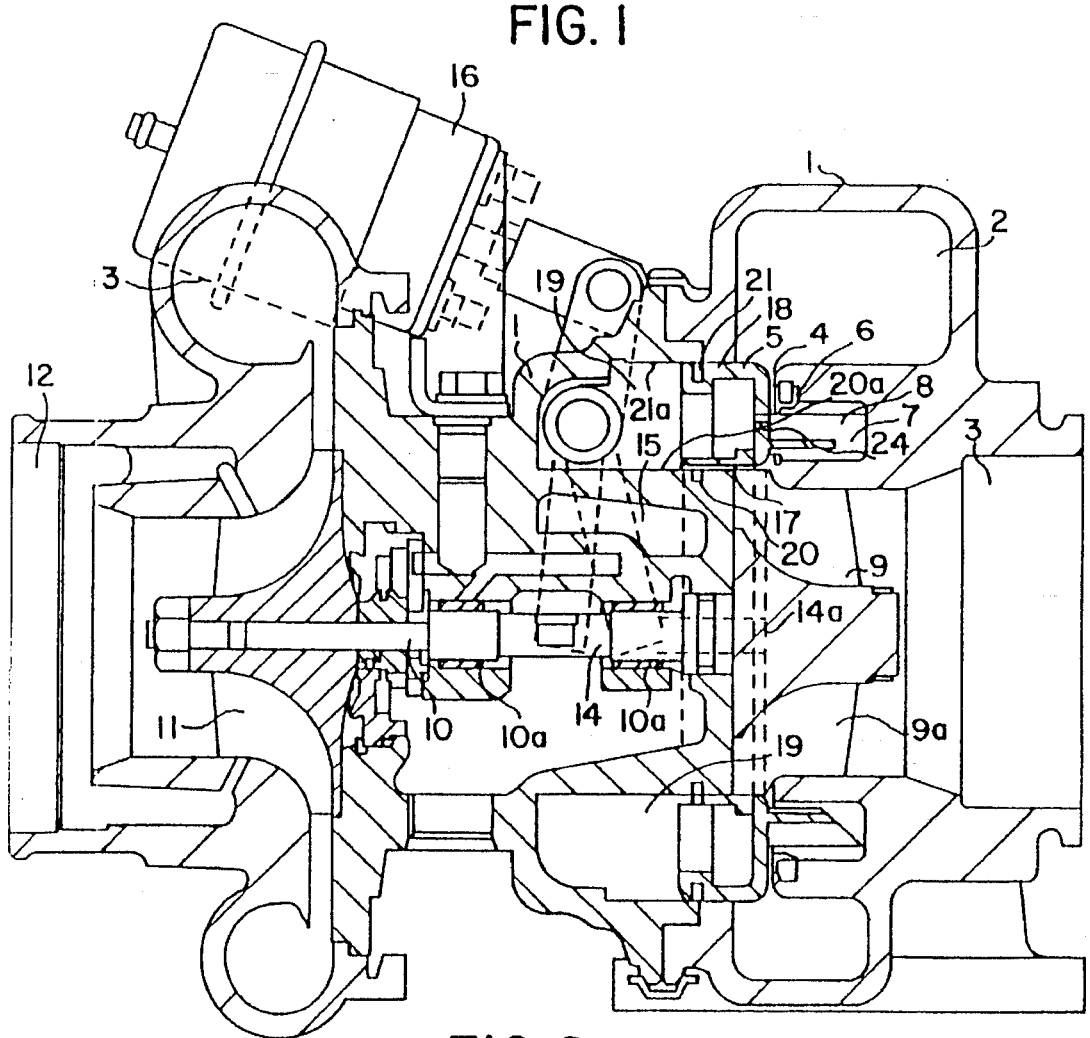
FIG. 1 is an axial cross-section of a variable geometry turbine in accordance with the present invention.

Referring to the drawings, the illustrated variable geometry turbine comprises a turbine housing 1 defining a volute or inlet chamber 2 to which exhaust gas from an internal combustion engine (not shown) is delivered. The exhaust gas flows from the inlet chamber 2 to an outlet passageway 3 via an annular radially directed inlet passageway 4 defined on one side by the end face 5a of a movable annular wall member 5 and on the opposite side by a radially extending annular shroud 6 in the form of a plate which covers the opening of an annular recess 7 defined in the facing wall of the housing 1, although a specific means for fixing shroud 6 in place over recess 7 is not illustrated, it should be apparent to those skilled in the art that a number of different approaches can be used. One example would be welding.

Figure 2:
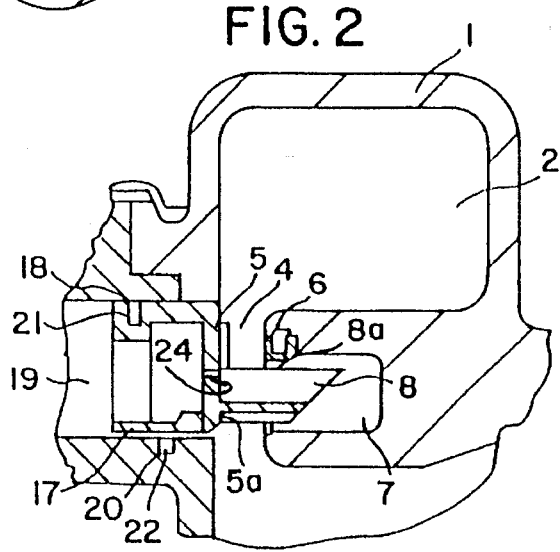
FIG. 2 is a cross section of a part of the turbine of FIG. 1 showing the moveable wall member in a different position to that shown in FIG. 1.

The moveable annular wall member 5 supports an array of circumferentially spaced vanes 8 each of which extends across the inlet passageway, through a suitably configured slot 8a in the shroud 6, and into the recess 7. As is apparent from the section lines in FIG. 2, the vanes 8 are oriented away from a radial plane and somewhat tangential so as to properly guide exhaust gas flow to the centripetal turbine vanes 9a.

Gas flowing from the inlet chamber 2 to the outlet passageway 3 passes over a plurality of vanes 9a of a centripetal turbine wheel 9 and as a result torque is applied to a turbocharger shaft 10 (journaled by means of bearings 10a) which drives a centrifugal compressor wheel 11. Rotation of the compressor wheel 11 pressurizes ambient air present in an air inlet 12 and delivers the pressurized air to an air outlet or volute 13 from which it is fed to an internal combustion engine (not shown). The RPM of the turbine wheel 9 is dependent upon the velocity of the gas passing through the annular inlet passageway 4. For a fixed rate of flow of gas, the gas velocity is a function of the width of the inlet passageway 4, which can be adjusted by controlling the axial position of the moveable wall member 5. In the drawings, FIG. 1 shows the annular inlet passageway closed down to a minimum width whereas in FIG. 2 the inlet passageway is shown substantially open. As the width of the inlet passageway 4 is reduced the velocity of the gas passing through it increases.

Movement of the annular wall member 5 may be controlled by any suitable actuation means such as, for instance, that disclosed in U.S. Pat. No. 5,044,880. In the illustrated example the actuation mechanism is based substantially on that of the aforementioned U.S. patent the moveable wall member 5 being mounted on the ends 14a of axially extending pins 14 (only one of which is shown by dashed lines in the drawings) the position of which is controlled by a stirrup member 15 (shown in dashed line) which is linked to a pneumatically operated actuator 16. Further details of the actuator system will not be discussed here as they are not relevant to the subject of the present invention.

The moveable annular wall member 5 has axially extending inner and outer annular flanges 17 and 18 respectively which extend into an annular cavity 19 provided in the turbine housing 1. Inner and outer sealing rings, 20 and 21 respectively, are provided to seal the wall member 5 with respect to inner and outer annular surfaces 20a, 21a of the annular cavity 19 while allowing the annular wall member 5 to slide within the annular cavity 19. The inner sealing ring 20 is supported within an annular groove 22 formed in the inner surface 20a of the cavity and bears against the inner annular flange 17 of the wall member 5, whereas the outer sealing ring 21 is supported within an annular groove 23 provided within the annular flange 18 of the wall member 5 and bears against the radially outermost internal surface 21a of the cavity 19. It will be appreciated that the inner sealing ring 20 could be mounted in an annular groove in the flange 17 rather than as shown and the outer ring in the outer wall of the annular cavity. Such an arrangement might make assembly easier.

The wall member 5 is provided with a number of apertures 24 disposed between adjacent pairs of vanes 8 by means of which the face of the wall member 5 which defines one wall of the annular inlet passageway 4 is in fluid communication with the cavity 19, which is otherwise sealed off from the inlet passageway 4 by the sealing rings 20 and 21.

When in use with exhaust gas passing through the inlet passageway 4, static pressure will be applied to the face of the annular wall member 5 tending to force the annular wall member 5 into the cavity 19. The previously mentioned pressure gradient that exists in the turbine inlet passageway is at a maximum at the radially outermost section and a minimum at the radially innermost section for any given position of the annular wall member 5. The effect of this pressure must be overcome by the actuating mechanism if the position of the wall member 5 is to be accurately controlled. Moving the wall member 5 closer to the facing wall 6 of the housing, so as to further reduce the width of the annular passageway 4 and increase the speed of the air flowing through the annular inlet passageway 4, tends to increase the load applied to the face of the wall member 5. The apertures 24 are positioned at a radial position between the inner and outer flanges 17 & 18 to communicate to the cavity 19 the optimum pressure for minimizing the force required from the actuator system for annular wall member 5. The provision of the apertures 24 through the wall member 5 ensures that the pressure in the cavity 19 is equal to the static pressure applied to the face of the wall member 5 at the location of the apertures 24, and thus by appropriate positioning of the apertures 24 the resultant load on the wall member may be significantly reduced. The load reducing effect of the apertures 24 will depend upon their size and number and exact location and may be varied for different applications and where the turbines have different characteristics.

A further consideration which is preferably taken into account when selecting the location and size of the apertures 24 is that it is undesirable for the pressure difference across the annular wall member 5 to change from a resultant in one axial direction to a resultant in the opposite axial direction as this might cause instability in the control of the position of the annular wall member 5. It will be appreciated that as the moveable wall member moves relative to the housing the pressure within the cavity 19 will not precisely track the load applied by the gas in the variable inlet passageway 4. It is preferable to locate the apertures 24 such that the resultant force on the moveable member 5 is always in one axial direction, even if as a result the resultant force is not minimized.

It is not necessary to provide apertures 24 between each set of vanes 8 to achieve the benefits of actuator force minimization. However, the multiple apertures more easily compensate for disturbances in the turbine inlet passageway 4.

Alternative sealing means to those illustrated may be provided to seal the moveable wall member 5 within the cavity 19. More than one seal may be provided between either the inner or outer peripheries of the wall member 5 and the housing 1. The seals may be for example piston ring types seals of rectangular cross section with a gap in their circumference so that they can expand or contract into a suitable groove. Alternatively, the seals may be double wound seals forming a spring-like structure. The seals may be inspringing so as to be suitable for location in a groove in an inwardly facing surface, or outspringing so as to be suitable for location in a groove in an outwardly facing surface.

Having thus described the invention, what is claimed as novel and desired to be secured by letters patent of the United States is:

1. A variable geometry turbine operable in response to gas flow, said turbine comprising:

a turbine wheel, a housing in which said turbine wheel is journaled for rotation, said housing having an annular turbine inlet passageway for gas flow extending radially inward toward the periphery of said turbine wheel and defined in part by a generally radially extending wall, said housing having an annular cavity with inner and outer annular walls adjacent said annular turbine inlet passageway, an annular moveable wall member having first & second end faces, said first end face cooperating with said radially extending wall to define the width of said annular inlet passageway as a function of the position of said end face, said annular moveable wall member comprising inner and outer annular flanges extending axially from the radially innermost and radially outermost portions of said end face into said annular cavity, said second end face being exposed to the interior of said annular cavity, means for sealing the radially outermost and innermost portions of said annular moveable wall member from the gasflow in said annular turbine inlet passageway, said sealing means comprising annular seals between said inner and outer flanges and the inner and outer annular walls of said cavity, and a plurality of apertures extending through the radially extending wall of said annular moveable wall member to connect the pressure in the gas flow through said annular turbine inlet passageway with the, interior of said annular cavity in said housing said apertures being positioned at a given radial position to generate an opposing force against movement of said annular moveable wall member in the direction to increase the width of said annular inlet passageway to minimize the force required to move said annular movable wall member.

2. A variable geometry turbine as in claim 1, wherein one of said seal means comprises an expandable ring received in a circumferential groove on the outer flange of said annular moveable wall member and abutting the outer annular wall of said cavity.

3. A variable geometry turbine as in claim 2 wherein the other of said seal means comprises an expandable ring received in a circumferential groove in the inner annular wall of said cavity and abutting the inner flange of said annular moveable wall member.

4. A variable geometry turbine as in claim 1 wherein said annular moveable wall member further comprises a plurality of vanes extending from said end face into said annular turbine inlet passage, and said apertures are positioned between adjacent vanes.

5. A variable geometry turbine as in claim 4 where in said turbine housing has an annular recess in said radially extending wall for receiving said vanes.

6. A variable geometry turbine as in claim 5 wherein said annular recess has a shroud with slots formed therein for receiving said vanes.

* * * * *